(12) United States Patent
Lawandy

(10) Patent No.: US 12,181,395 B2
(45) Date of Patent: Dec. 31, 2024

(54) OPTICAL SYSTEMS AND METHODS OF PROBING BIOLOGICAL FLUIDS

(71) Applicant: Solaris BioSciences, Inc., Providence, RI (US)

(72) Inventor: Nabil Lawandy, Saunderstown, RI (US)

(73) Assignee: Solaris BioSciences, Inc., Providence, RI (US)

(*) Notice: Subject to any disclaimer, the term of this patent is extended or adjusted under 35 U.S.C. 154(b) by 21 days.

(21) Appl. No.: 18/205,154

(22) Filed: Jun. 2, 2023

(65) Prior Publication Data

US 2024/0302260 A1 Sep. 12, 2024

Related U.S. Application Data

(60) Provisional application No. 63/451,421, filed on Mar. 10, 2023.

(51) Int. Cl.
*G01N 11/00* (2006.01)
*G01N 21/64* (2006.01)

(52) U.S. Cl.
CPC ......... *G01N 11/00* (2013.01); *G01N 21/6428* (2013.01); *G01N 2011/008* (2013.01)

(58) Field of Classification Search
CPC .. G01N 31/22; G01N 33/54313; G01N 15/10; G01N 15/1492; G01N 2015/1006; G01N 2015/1481; G01N 2021/6421; G01N 2021/6432; G01N 2021/6441; G01N 21/643; G01N 21/6456; G01N 2500/20; G01N 33/2805; G01N 33/48707; G01N 33/5432; G01N 33/585; G01N 33/92; G01N 35/08; G01N 1/30; G01N 13/02; G01N 15/06; G01N 15/1459; G01N 2001/2223; G01N 2015/1486; G01N 21/6445; G01N 2201/06113; G01N 2291/011;

(Continued)

(56) References Cited

U.S. PATENT DOCUMENTS

2004/0142386 A1* 7/2004 Rigler ................ G01N 21/6458
435/7.2

FOREIGN PATENT DOCUMENTS

BR 122020025291 B1 * 6/2021 ............ G01J 3/0289
JP 2012132741 A * 7/2012

(Continued)

*Primary Examiner* — Michael P Stafira
(74) *Attorney, Agent, or Firm* — Pryor Cashman LLP

(57) ABSTRACT

A system and method for determining a viscosity of a fluid medium containing a fluorescent species, including a light source exciting the fluorescent species at an excitation area of the fluid medium to produce a fluorescent signal and photobleaching the fluorescent species, and the fluorescent species diffusing in and out of the excitation area of the fluid medium at a rate determined by an excitation geometry of the light source, a diffusivity of the fluorescent species, and the viscosity of the fluid medium; and a detector detecting the fluorescent signal over time to generate a fluorescence decay curve of the fluorescent species in the fluid medium, where the viscosity of the fluid medium is determined based on a numerical comparison of the fluorescence decay curve of the fluorescent species in the fluid medium with a fluorescence decay curve of the fluorescent species in a reference medium of known viscosity.

20 Claims, 3 Drawing Sheets

(58) Field of Classification Search
CPC ... G01N 2291/015; G01N 2291/02818; G01N 2291/045; G01N 29/02; G01N 29/222; G01N 29/326; G01N 29/4427; G01N 33/2894; G01N 33/5005; G01N 33/52; G01N 33/5308; G01N 35/1097
See application file for complete search history.

(56) References Cited

FOREIGN PATENT DOCUMENTS

| | | | |
|---|---|---|---|
| WO | WO-9200796 A1 * | 1/1992 | |
| WO | WO-9416313 A2 * | 7/1994 | ............... C12Q 1/04 |

* cited by examiner

OPTICAL SYSTEMS AND METHODS OF PROBING BIOLOGICAL FLUIDS

CROSS-REFERENCE TO RELATED APPLICATIONS

The present application claims priority to U.S. provisional application Ser. No. 63/451,421, filed Mar. 10, 2023, the disclosure of which is incorporated herein by reference in its entirety.

TECHNICAL FIELD

The present invention relates generally to systems and methods for measuring the viscosity of a medium, e.g., biofluid including but not limited to serum, plasma, blood, urine, ocular fluid, and spinal fluid. More specifically, the present invention relates to the use of transient photobleaching to determine diffusivity and viscosity of biofluids.

BACKGROUND OF THE INVENTION

The determination of protein diffusivity and biofluid viscosity provides clinically useful information on various conditions in humans and animals, including but not limited to inflammatory response (e.g., infection, cytokine surges, surgical trauma, and hyperviscosity syndrome), thrombophilia, diabetes, cardiovascular disease, Alzheimer's disease, hematological cancer, myeloma, rheumatoid arthritis, and COVID-19 including long COVID-19 transition to an acute phase response.

Plasma, which is a major component of blood, is composed primarily of water and includes several proteins, namely albumin, globulins ($\alpha$, $\beta$, $\gamma$), fibrinogen, paraproteins, and lipoproteins, which affect the viscosity of the plasma. Blood plasma viscosity in humans has a normal range of 1.3-1.8 millipoise at 22° C. A patient's blood plasma viscosity outside and above this range may indicate an elevated level of these proteins, resulting from lymphoid malignancies. Moreover, severeness of COVID-19 symptoms and increased likelihood of developing blood clots have been associated with elevated plasma viscosity levels.

Chylomicrons are one such plasma lipoprotein and serve the purpose of transporting dietary triglycerides and cholesterol absorbed by intestinal epithelia. The chylomicron assembly originates in the intestinal mucosa, where excretion into the plasma is facilitated through the lymphatic system. Very-low-density lipoproteins (VLDL) are created by the liver and released into the blood stream. VLDLs carry different types of fats, including triglycerides, to cells.

Typically, viscosity of a biofluid, namely serum, plasma, blood, urine, ocular fluid, and spinal fluid, is determined using various viscometers, including cone and plate, capillary, and micro electrical mechanical system (MEMS)-based devices, which can operate with microliter volumes. Concerning blood, plasma, and serum, related methods such as Erythrocyte Sedimentation Rate (ESR) are utilized and are a part of the standard palette of tests used by clinicians. The ESR, or sed rate, is the rate at which red blood cells in anticoagulated whole blood descend in a standardized tube over a period of one hour. This is a common hematology test and is a non-specific measure of inflammation. To perform the test, anticoagulated blood is traditionally placed in an upright tube, known as a Westergren tube, and the distance which the red blood cells fall is measured and reported in millimeters at the end of one hour.

The ESR is governed by the balance between pro-sedimentation factors, mainly fibrinogen, and those factors resisting sedimentation, namely the negative charge of the erythrocytes (zeta potential). When an inflammatory source is present, the high proportion of fibrinogen in the blood causes red blood cells to stick to each other to form stacks called rouleaux, which settle faster due to their increased density. Rouleaux formation can also occur in association with some lymphoproliferative disorders in which one or more paraproteins are secreted in high amounts. While abnormal in humans, rouleaux formation can be a normal physiological finding in horses, cats, and pigs. Advances in shortening the time of this measurement process have been developed using camera images over the first several seconds to minutes and using predictive numerical models.

In general, objects or particles smaller than the wavelength of the light experience forces and acquire a potential energy in a non-uniform light field as well as radiation pressure forces. A particle, such as a nanoparticle, in a light field will experience a force proportional to the gradient of the energy in the light field and a radiation pressure force due to scattering or absorption resulting in a force proportional to the local intensity. When the particles move through the medium, they will also experience a viscous drag when the particle moves through the medium. When a non-uniform light source is applied, the particles are dragged in the medium and their movement is determined by dynamic viscosity ($\eta$) and particle size or hydrodynamic radius (a), according to Stokes Law, $F=6\pi a\eta V$, where F is the force the medium exerts on the moving particle, n is the dynamic viscosity as a function of temperature, and V is the particle velocity.

Ultimately, objects or particles, e.g., nanoparticles, in a medium with a higher index of refraction will move toward the regions having the highest intensity of the light field. Stated alternatively, light drags such objects or particles through the medium to the regions of highest intensity, with the distance, velocity, and time to reach a new steady state density distribution dependent on the viscosity of the medium and the hydrodynamic radius of the particles, which may change as a result of surface reactions on the particles. The use of an excitation beam for exciting fluorescent nanoparticles, fluorescence from a liquid medium with scattering nanoparticles, up-conversion from nanoparticles, or direct scattering of the excitation beam, can be used to monitor the nanoparticle dynamics after a second non-uniform optical beam is introduced into the system to initiate movement of the particles in the medium, such as a biofluid. This can be further enhanced using a photobleachable fluorescent species, or fluorophore, where the radiation forces are used to replenish the photobleachable fluorescent species that have been photobleached with the photobleachable fluorescent species that have not been photobleached.

Accordingly, another method for determining diffusivity and, via Einstein-Stokes type relationships, inferring viscosity, is Fluorescence Recovery After Photobleaching (FRAP). In this method, a fluorophore is photobleached by a pulse of intense light, and the fluorescence recovery due to unbleached molecules diffusing into the region, replacing photobleached fluorophores by diffusion, is monitored by a much weaker light source. FIG. 1 shows this process as a function of time, specifically where (A) a sample is uniformly labeled with a fluorescent tag, (B) this sample is photobleached by a small, fast light pulse, (C) the intensity within this bleached area is monitored as the bleached dye diffuses out and new dye diffuses in, and (D) a uniform intensity is eventually restored. Put differently, the period from (A) to (B) is the photobleaching with an intense source, and the recovery of fluorescence monitored by a weak source proceeds from (B) to (C) to (D). The characteristic time from (B) to (C) is related to the diffusion coefficient and the excitation geometry of the light source in reference to the sample, i.e., the light source dimensions on the contacting plane of the sample. From the recovery time $t_D$, the diffusion coefficient (D) can be inferred from a relation such as the one for a Gaussian beam profile given by:

$$D = \frac{w^2}{4t_D}$$

where w is radius of the beam. The viscosity (η) can be then determined by the generalized Einstein-Stokes relation given by:

$$D = \frac{C}{\eta^P},$$

where P is an exponent between 0.79 and 1.0. The fluorescence recovery approach requires a pulsed intense source, which can result in heating of the solution and thereby affecting the viscosity measured by the secondary weaker fluorescence excitation source that monitors the recovery by diffusion. For example, the viscosity of water changes by nearly 15% from 10° C. to 15° C.

However, one problem with the FRAP methodology is that, though the second beam utilized for monitoring the recovery by fluorophore diffusion is a weak light source, this beam also serves to photobleach the sample during the critical second step of the process that yields diffusion coefficient D. Thus, this two-step, two-intensity FRAP methodology involves photobleaching in both steps. Moreover, the FRAP process requires a rapid switching of beam intensity on a time scale much shorter than tp. Accordingly, there is a need in the art for a streamlined process utilizing fluorescence and advantageously eliminating the two-step, two-intensity switching process of FRAP.

SUMMARY OF THE INVENTION

In general, in one aspect, the invention features a system for determining a viscosity of a fluid medium containing a fluorescent species capable of emitting a fluorescent signal, the system including a light source providing radiation of a fixed intensity and having an excitation geometry when directed at the fluid medium, the light source capable of exciting the fluorescent species at an excitation area of the fluid medium to produce the fluorescent signal and photobleaching the fluorescent species, and the fluorescent species diffusing in and out of the excitation area of the fluid medium at a rate determined by the excitation geometry of the light source, a diffusivity of the fluorescent species, and the viscosity of the fluid medium; and a detector capable of detecting the fluorescent signal over time to generate a fluorescence decay curve of the fluorescent species in the fluid medium, where the viscosity of the fluid medium is determined based on a numerical comparison of the fluorescence decay curve of the fluorescent species in the fluid medium with a fluorescence decay curve of the fluorescent species in a reference medium of known viscosity.

Implementations of the invention may include one or more of the following features. The system may include a filter utilized in connection with the detector. The system may include a beam splitter disposed such that both the radiation of the light source and the fluorescent signal pass through the beam splitter, the beam splitter directing the fluorescent signal to the detector. The system may include one or more lenses disposed on an optical pathway with the light source or the detector. The detector may be a photosensor, which may be a photodiode, a photocell, or a photomultiplier.

The fluid medium may be serum, plasma, blood, urine, ocular fluid, or spinal fluid. The fluid medium may be serum or plasma and the fluorescent species may be bilirubin bound to albumin. The fluid medium may be plasma or serum obtained from a pinprick of blood subjected to a microcapillary separation to separate a hematocrit from the blood. The fluid medium may be urine and the fluorescent species may be urobilin or urochrome. The fluorescent species may be a photobleachable dye, which may be fluorescein.

In general, in another aspect, the invention features a method for determining a viscosity of a fluid medium containing a fluorescent species capable of emitting a fluorescent signal, the method including directing a light source at the fluid medium, the light source providing radiation of a fixed intensity and having an excitation geometry when directed at the fluid medium, to excite the fluorescent species at an excitation area of the fluid medium to produce the fluorescent signal and photobleach the fluorescent species, the fluorescent species diffusing in and out of the excitation area of the fluid medium at a rate determined by the excitation geometry of the light source, a diffusivity of the fluorescent species, and the viscosity of the fluid medium; detecting the fluorescent signal with a detector over time to generate a fluorescence decay curve of the fluorescent species in the fluid medium; and determining the viscosity of the fluid medium based on a numerical comparison of the fluorescence decay curve of the fluorescent species in the fluid medium with a fluorescence decay curve of the fluorescent species in a reference medium of known viscosity.

Implementations of the invention may include one or more of the following features. The fluid medium may be serum, plasma, blood, urine, ocular fluid, or spinal fluid. The fluid medium may be serum or plasma and the fluorescent species may be bilirubin bound to albumin. The fluid medium may be plasma or serum obtained from a pinprick of blood subjected to a microcapillary separation to separate a hematocrit from the blood. The fluid medium may be urine and the fluorescent species may be urobilin or urochrome. The fluorescent species may be a photobleachable dye, which may be fluorescein.

In general, in another aspect, the invention features a system for determining a viscosity of a fluid medium containing a fluorescent species capable of emitting a fluorescent signal, including a light source providing radiation of a fixed intensity and having an excitation geometry when directed at the fluid medium, the light source capable of exciting the fluorescent species at an excitation area of the fluid medium to produce the fluorescent signal and photobleaching the fluorescent species, and the fluorescent species diffusing in and out of the excitation area of the fluid medium at a rate determined by the excitation geometry of the light source, a diffusivity of the fluorescent species, and the viscosity of the fluid medium; a detector capable of detecting the fluorescent signal over time to generate a fluorescence decay curve of the fluorescent species in the fluid medium; and optionally, one or more of a filter utilized in connection with the detector; a beam splitter disposed such that both the radiation of the light source and the fluorescent signal pass through the beam splitter, the beam splitter directing the fluorescent signal to the detector; and one or more lenses disposed on an optical pathway with the light source or the detector, where the viscosity of the fluid medium is determined based on a numerical comparison of the fluorescence decay curve of the fluorescent species in the fluid medium with a fluorescence decay curve of the fluorescent species in a reference medium of known viscosity.

DETAILED DESCRIPTION OF THE PREFERRED EMBODIMENTS

The present invention is directed to the use of transient photobleaching to determine diffusivity and viscosity of biofluids. In particular, to avoid the aforementioned deficiencies of the FRAP process, the present invention may utilize a single light or radiation source providing radiation of a fixed intensity that serves as a photobleaching source, such as a laser diode or an LED, and having an excitation geometry with respect to the medium sample, namely the light or radiation source dimensions on the contacting plane of the medium sample. The present invention may also utilize a single detector having an appropriate filter for detecting emitted fluorescence, or fluorescent signal, from a fluorescent species in the medium sample over time, ultimately generating a fluorescence decay curve. In this invention, the single light source and the single detector may be sufficient to determine the recovery rate by diffusion, which ultimately provides for the determination of diffusivity and viscosity.

Figure 1:
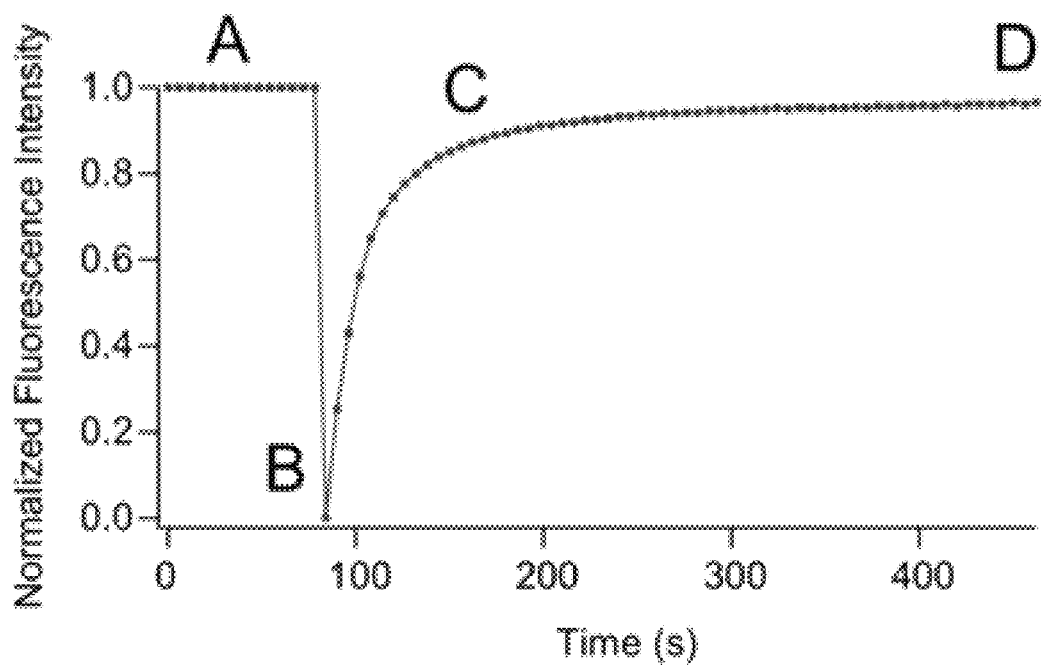
FIG. 1 illustrates a graphical representation of the FRAP process as a function of time.
Figure 2:
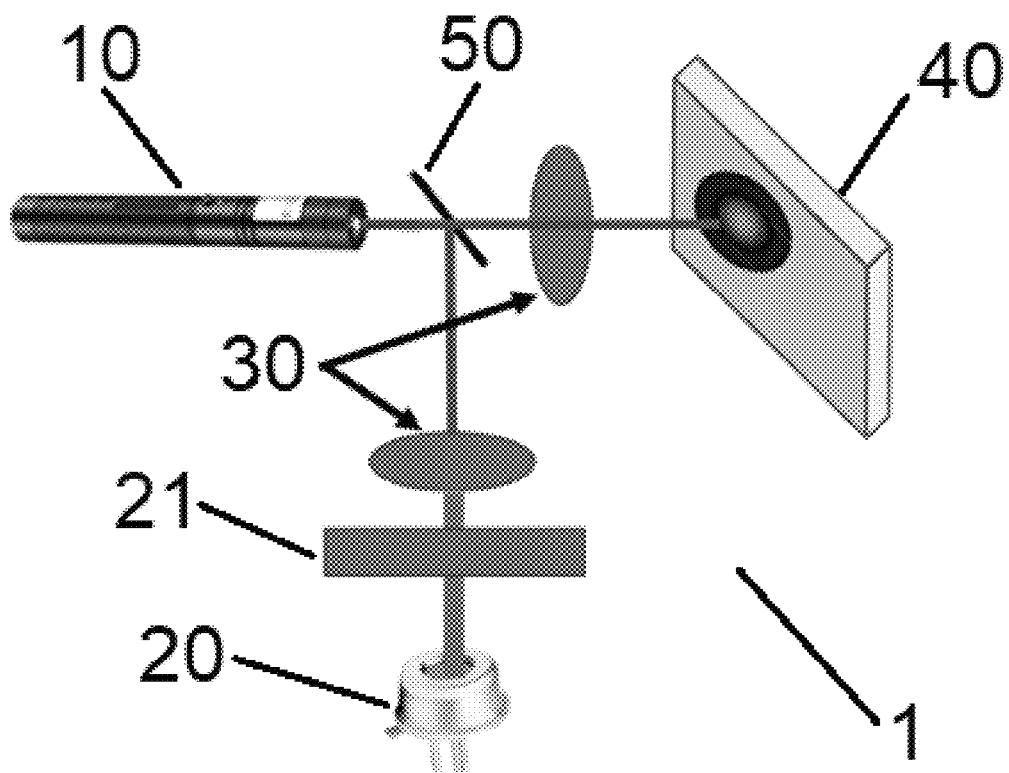
FIG. 2 illustrates a schematic of a system according to one embodiment of the present invention.

In one embodiment of a system 1 of the present invention, as illustrated in FIG. 2, a single light beam 10 is switched on (or, alternatively, a shutter is opened in front of a continuous wave optical beam) and focused into a sample 40 having a thickness small in comparison to the Rayleigh length of the focused beam, i.e., a localized region of sample 40. The emitted fluorescence, or fluorescent signal, is collected through the same optical pathway and diverted, via beam splitter 50, to and through a filter 21 and then detected by a photosensor 20, such as a photodiode, a photocell, a photomultiplier, or other radiation detector. Lenses 30 may also be provided in the system, such as in front of sample 40 and/or in front of filter 21 or photosensor 20.

The fluorescent species in the analyzed sample diffuses in the fluid medium at a rate determined by the excitation geometry of the light source in contact with the analyzed sample, a diffusivity associated with the fluorescent species, and the viscosity of the fluid medium. The process associated with the present invention, including system 1, may operate such that non-photobleached fluorescent species, i.e., fluorescent species that has not yet been photobleached by the light source, diffuse into the localized region of the analyzed sample, and the photobleached fluorescent species diffuse out of this localized region. Ultimately, excitation of the non-photobleached fluorescent species and diffusion of the photobleached fluorescent species may reach a steady state.

Figure 3:
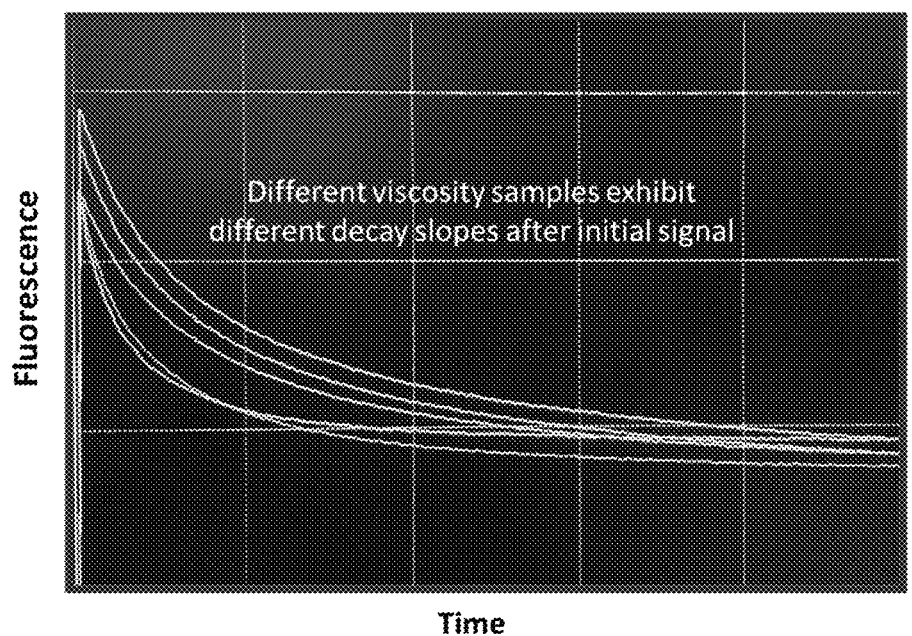
FIG. 3 illustrates a graphical representation of fluorescence over time through use of a system according to an embodiment of the present invention.

Through use of systems of the present invention, such as that of FIG. 2, graphical representations of fluorescence over time may be generated, e.g., a fluorescence decay curve. FIG. 3 provides one such graphical representation of fluorescence signals over time. As noted in FIG. 3, different viscosity samples will exhibit different decay slopes following the initial signal. The curves of these decay slopes are always able to fit the equation in the following form:

$$S = A[e^{-gt} - e^{-ct}] + B[1 - e^{-ct}]$$

where S is the detected fluorescence, A, B, and g are fit parameters with g being the rate at which excited fluorescent molecules return to the ground state, and c is the rate of diffusion-driven replenishment of photobleached molecules by fluorescent ones. Accordingly, c is the parameter sought to determine the diffusivity and, within a geometrical factor, is equivalent to $1/t_D$.

Figure 4:
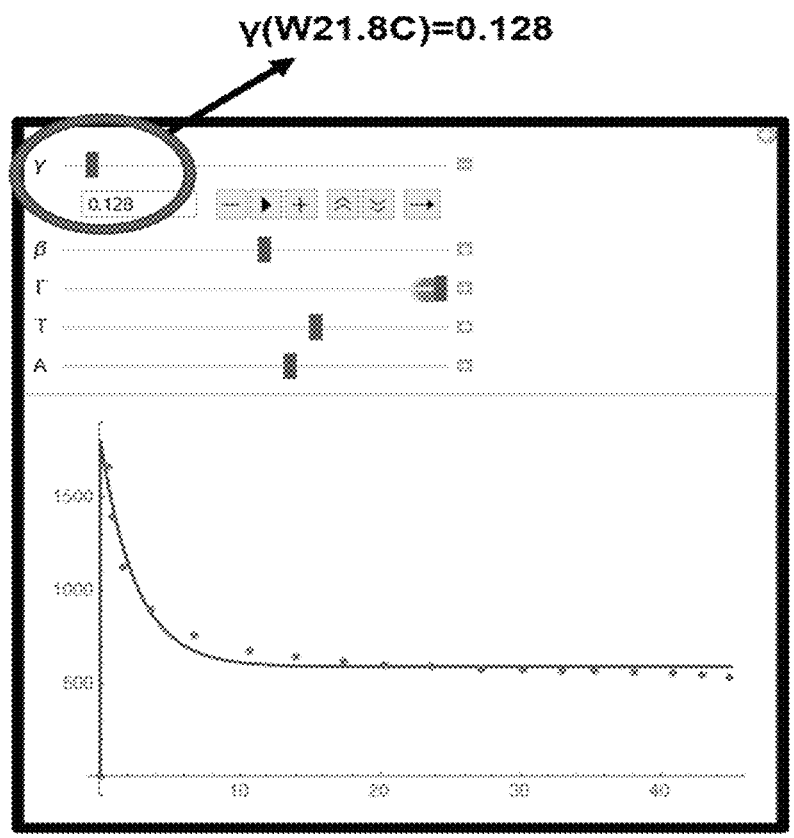
FIG. 4 illustrates a decay curve and fit for a $10^{-5}$ Molar water solution of fluorescein sodium at 21.8° C.

In a preferred embodiment of the present invention, an effective manner of utilizing the aforementioned system and process for determining D and n is to measure and fit the parameters for a fluid of known viscosity at a given temperature, such as water, while employing one or more photobleachable dyes (e.g., multiple dyes), including fluorescein, in both the reference and the liquid of interest at the same concentration. FIG. 4 shows the decay curve and fit for a $10^{-5}$ Molar water solution of fluorescein sodium at 21.8° C. Accordingly, the systems and methods of the present invention may be utilized to determine a viscosity of a subject fluid medium by virtue of a numerical comparison of the measured fluorescence decay curve of the fluorescent species in the subject fluid medium with the fluorescence decay curve of the fluorescent species in a reference fluid medium, where the viscosity of the reference fluid medium is known or established. Such a numerical comparison may be but is not limited to a curve fitting process.

Figure 5:
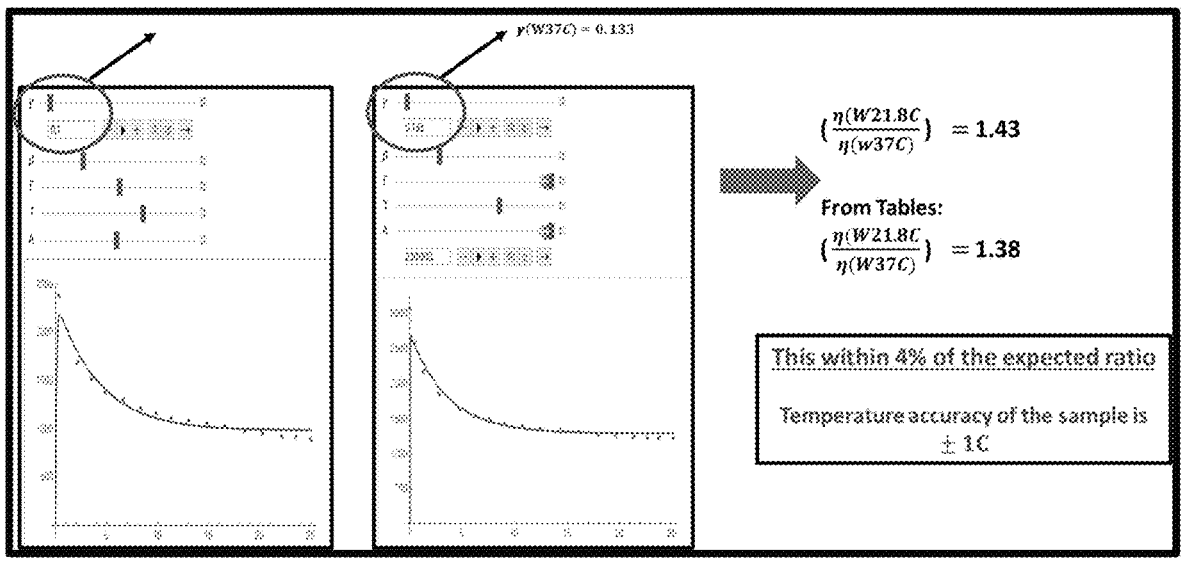
FIG. 5 illustrates decay curves and fits for $10^{-5}$ Molar water solutions of fluorescein sodium at 21.8° C. and 37° C.

Additionally, as an example of viscosity determination, decay curves and fits for water including fluorescein at two different temperatures may be compared. The viscosity of water as a function of temperature is well-quantified; accordingly, viscosity at another temperature may be determined by the process of the present invention and compared to the standard values. FIG. 5 shows the data and relative accuracy of this rapid and simple process of the present invention, in particular through a comparison of $10^{-5}$ Molar water solutions of fluorescein sodium at 21.8° C. and 37° C.

Figure 6:
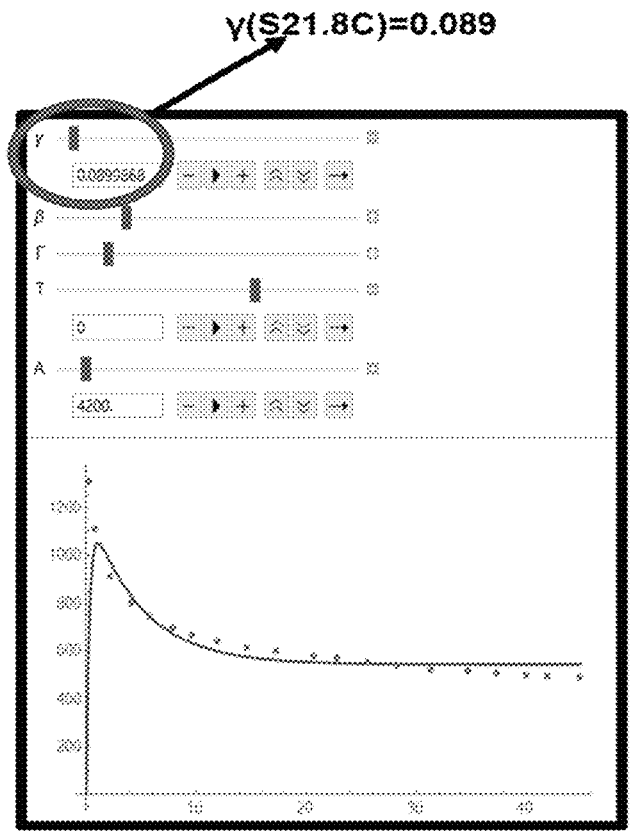
FIG. 6 illustrates a decay curve and fit for human serum at 21.8° C.

In certain embodiments of the present invention, including but not limited to where the biofluid is serum, plasma, blood, or urine, fluorescent photobleachable species, e.g., naturally-occurring fluorophores, may already be present in the biofluid of interest. FIG. 6 show a decay curve and fit for human serum at 21.8° C. to determine the diffusivity and viscosity. The plasma or serum may be derived from a pinprick of blood that has undergone a microcapillary separation technique to separate the hematocrit from the blood. In the case of serum, plasma, blood, and urine in particular, conjugated bilirubin, such as when bound to albumin, is fluorescent in the green spectral region when excited by commonly-available laser diodes in the 400-500 nm range. In an additional case involving urine, urobilin or urochrome may be utilized as the fluorescent compound for purposes of the present invention. Additionally, naturally-present fluorescent moieties and molecules in the biofluid of interest, e.g., a component of the biofluid, may serve as the pertinent fluorescent species of the present invention, which includes the embodiments of bilirubin bound to albumin in serum or plasma and urobilin or urochrome in urine.

While these embodiments of the present invention are described in relation to medical-based applications, the present invention is not so limited and may be generally utilized, e.g., in connection with detecting phase transitions in liquids.

The embodiments and examples above are illustrative, and many variations can be introduced to them without departing from the spirit of the disclosure or from the scope of the invention. For example, elements and/or features of different illustrative and exemplary embodiments herein may be combined with each other and/or substituted with each other within the scope of this disclosure. Therefore, it is intended that the invention not be limited to the particular embodiments disclosed, but that the invention will include all embodiments falling within the scope of the claims. For a better understanding of the invention, its operating advantages and the specific objects attained by its uses, reference should be had to the accompanying drawings and descriptive matter, in which there is illustrated a preferred embodiment of the invention.

What is claimed is:

1. A system for determining a viscosity of a fluid medium containing a fluorescent species capable of emitting a fluorescent signal, the system comprising:
    a light source providing radiation of a fixed intensity and having an excitation geometry when directed at the fluid medium, the light source capable of exciting the fluorescent species at an excitation area of the fluid medium to produce the fluorescent signal and photobleaching the fluorescent species, and the fluorescent species diffusing in and out of the excitation area of the fluid medium at a rate determined by the excitation geometry of the light source, a diffusivity of the fluorescent species, and the viscosity of the fluid medium; and
    a detector capable of detecting the fluorescent signal over time to generate a fluorescence decay curve of the fluorescent species in the fluid medium,
    wherein the viscosity of the fluid medium is determined based on a numerical comparison of the fluorescence decay curve of the fluorescent species in the fluid medium with a fluorescence decay curve of the fluorescent species in a reference medium of known viscosity.

2. The system of claim 1, further comprising a filter utilized in connection with the detector.

3. The system of claim 1, further comprising a beam splitter disposed such that both the radiation of the light source and the fluorescent signal pass through the beam splitter, the beam splitter directing the fluorescent signal to the detector.

4. The system of claim 1, further comprising one or more lenses disposed on an optical pathway with the light source or the detector.

5. The system of claim 1, wherein the detector is a photosensor.

6. The system of claim 5, wherein the photosensor is a photodiode, a photocell, or a photomultiplier.

7. The system of claim 1, wherein the fluid medium is serum, plasma, blood, urine, ocular fluid, or spinal fluid.

8. The system of claim 7, wherein the fluid medium is serum or plasma and wherein the fluorescent species is bilirubin bound to albumin.

9. The system of claim 7, wherein the fluid medium is plasma or serum obtained from a pinprick of blood subjected to a microcapillary separation to separate a hematocrit from the blood.

10. The system of claim 7, wherein the fluid medium is urine and wherein the fluorescent species is urobilin or urochrome.

11. The system of claim 1, wherein the fluorescent species is a photobleachable dye.

12. The system of claim 11, wherein the photobleachable dye is fluorescein.

13. A method for determining a viscosity of a fluid medium containing a fluorescent species capable of emitting a fluorescent signal, the method comprising:
    directing a light source at the fluid medium, the light source providing radiation of a fixed intensity and having an excitation geometry when directed at the fluid medium, to excite the fluorescent species at an excitation area of the fluid medium to produce the fluorescent signal and photobleach the fluorescent species, the fluorescent species diffusing in and out of the excitation area of the fluid medium at a rate determined by the excitation geometry of the light source, a diffusivity of the fluorescent species, and the viscosity of the fluid medium;
    detecting the fluorescent signal with a detector over time to generate a fluorescence decay curve of the fluorescent species in the fluid medium; and
    determining the viscosity of the fluid medium based on a numerical comparison of the fluorescence decay curve of the fluorescent species in the fluid medium with a fluorescence decay curve of the fluorescent species in a reference medium of known viscosity.

14. The method of claim 13, wherein the fluid medium is serum, plasma, blood, urine, ocular fluid, or spinal fluid.

15. The method of claim 14, wherein the fluid medium is serum or plasma and wherein the fluorescent species is bilirubin bound to albumin.

16. The method of claim 14, wherein the fluid medium is plasma or serum obtained from a pinprick of blood subjected to a microcapillary separation to separate a hematocrit from the blood.

17. The method of claim 14, wherein the fluid medium is urine and wherein the fluorescent species is urobilin or urochrome.

18. The method of claim 13, wherein the fluorescent species is a photobleachable dye.

19. The method of claim 18, wherein the photobleachable dye is fluorescein.

20. A system for determining a viscosity of a fluid medium containing a fluorescent species capable of emitting a fluorescent signal, the system consisting of:
    a light source providing radiation of a fixed intensity and having an excitation geometry when directed at the fluid medium, the light source capable of exciting the fluorescent species at an excitation area of the fluid medium to produce the fluorescent signal and photobleaching the fluorescent species, and the fluorescent species diffusing in and out of the excitation area of the fluid medium at a rate determined by the excitation geometry of the light source, a diffusivity of the fluorescent species, and the viscosity of the fluid medium;
a detector capable of detecting the fluorescent signal over time to generate a fluorescence decay curve of the fluorescent species in the fluid medium; and
optionally, one or more of:
  a filter utilized in connection with the detector;
  a beam splitter disposed such that both the radiation of the light source and the fluorescent signal pass through the beam splitter, the beam splitter directing the fluorescent signal to the detector; and
  one or more lenses disposed on an optical pathway with the light source or the detector,
wherein the viscosity of the fluid medium is determined based on a numerical comparison of the fluorescence decay curve of the fluorescent species in the fluid medium with a fluorescence decay curve of the fluorescent species in a reference medium of known viscosity.

* * * * *